United States Patent
Watanabe

(10) Patent No.: US 7,535,598 B2
(45) Date of Patent: May 19, 2009

(54) IMAGE RECORDING APPARATUS AND IMAGE PROCESSING SYSTEM

(75) Inventor: Kazumitsu Watanabe, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 674 days.

(21) Appl. No.: 11/146,331

(22) Filed: Jun. 7, 2005

(65) Prior Publication Data

US 2005/0280877 A1 Dec. 22, 2005

(30) Foreign Application Priority Data

| Jun. 16, 2004 | (JP) | 2004-178855 |
| Aug. 10, 2004 | (JP) | 2004-233872 |
| Apr. 27, 2005 | (JP) | 2005-130584 |
| Apr. 27, 2005 | (JP) | 2005-130585 |

(51) Int. Cl.
*H04N 1/409* (2006.01)

(52) U.S. Cl. .......... 358/3.26; 358/1.9; 358/448

(58) Field of Classification Search .......... 358/1.1, 358/1.9, 3.26, 1.15, 434, 438, 442, 448, 468
See application file for complete search history.

(56) References Cited

U.S. PATENT DOCUMENTS

| 5,917,578 A | 6/1999 | Nakamura |
| 6,072,586 A | 6/2000 | Bhargava et al. |
| 6,650,435 B1 | 11/2003 | Ikeda |
| 6,747,757 B1 * | 6/2004 | Enomoto .......... 358/1.9 |
| 2003/0174886 A1 * | 9/2003 | Iguchi et al. .......... 382/167 |

FOREIGN PATENT DOCUMENTS

| EP | 0 766 450 A2 | 4/1997 |
| EP | 1 137 248 A2 | 9/2001 |
| JP | 5-158134 | 6/1993 |
| JP | 6-319106 | 11/1994 |
| JP | 9-15681 | 1/1997 |
| JP | H9-281613 A | 10/1997 |
| JP | 9-294225 | 11/1997 |
| JP | 10-177643 | 6/1998 |
| JP | 11-88732 | 3/1999 |
| JP | 11-275444 | 10/1999 |
| JP | 2001-230999 | 8/2001 |
| JP | 2002-262159 | 9/2002 |

* cited by examiner

*Primary Examiner*—Thomas D Lee
(74) *Attorney, Agent, or Firm*—Oblon, Spivak, McClelland, Maier & Neustadt, P.C.

(57) ABSTRACT

An image processing system (200, 201) (image recording apparatus (100, 101)) including: image data keeping structure (image recording device (4, 20)/image producing device (57, 80)) for having image data and process information added to the image data; and image processing structure (image processing device (1, 11, 57, 80)) for receiving the image data to which the process information is added, the image processing structure (1, 11, 57, 80), executing an image process on the image data based on the added process information.

15 Claims, 12 Drawing Sheets

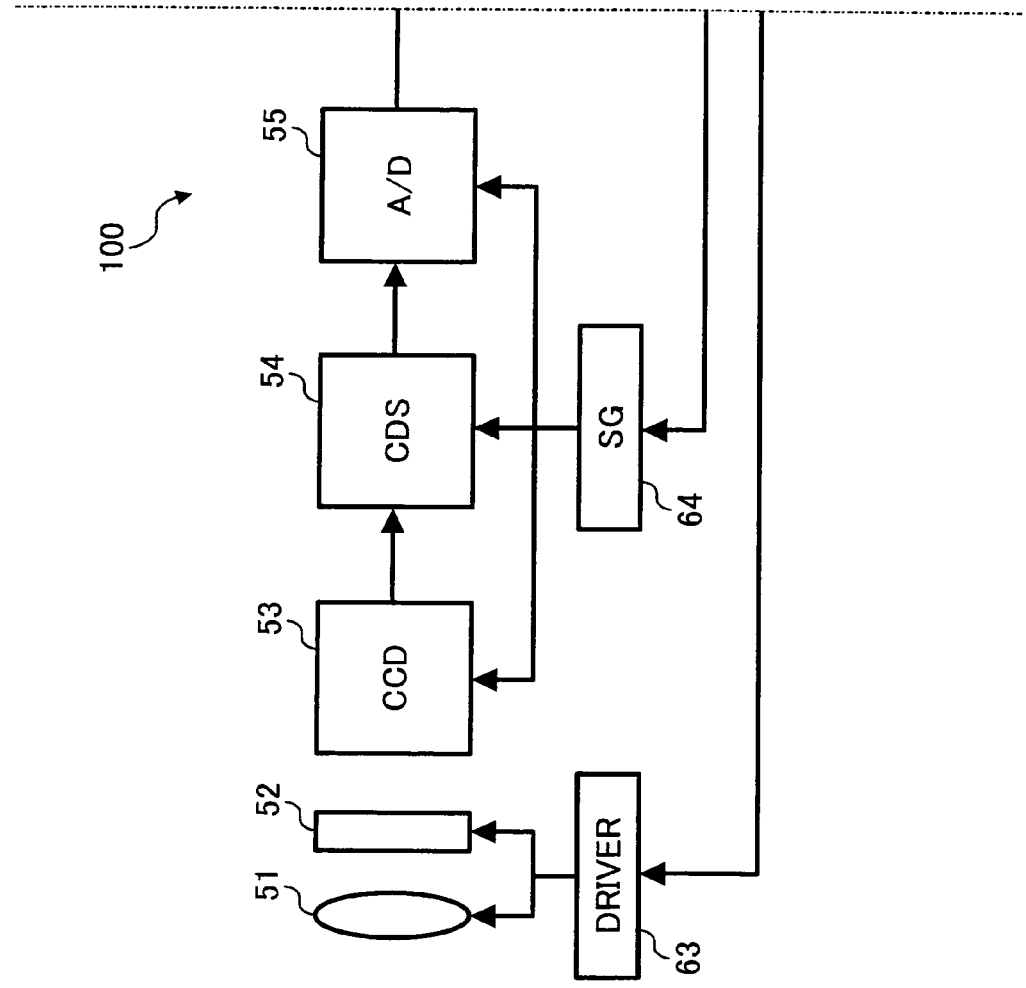

IMAGE RECORDING APPARATUS AND IMAGE PROCESSING SYSTEM

BACKGROUND OF THE INVENTION

1. Field of the Invention

The present invention relates to an image recording apparatus for executing an image process on read image data and for storing the executed image data, and an image processing system including an image processing apparatus such as a personal computer or a printer capable of responding to direct printing. Particularly, the present invention relates to an image recording apparatus and an image processing system capable of automatically and simply executing an image process such as distortion aberration correction or peripheral light intensity correction.

2. Description of Related Art

Digital still cameras which are capable of recording a photographed object as digital data have been hitherto known. According to an apparatus like the digital camera, it is common that photographed image data are stored in a memory located in a body of the apparatus and are picked up as circumstances demand, as described in Japanese Patent Laid-Open No. 2001-230999 (hereinafter referred to as "reference 1"). That is, image data can be transferred to and from an external device by way of transmission.

Conventionally, in image recording apparatuses for executing an image process on read image data and for recording the processed data, various image processes are executed on the image data to record the processed data.

A process such as distortion aberration correction or peripheral light intensity correction may be executed on image data as need arises. As a distortion aberration correction process, generally known is a table look-up method where a lens distortion aberration rate is predetermined at each focusing point and zoom position, as described in Japanese Patent Laid-Open No. H9-294225 (hereinafter referred to as "reference 2"). In the reference 2, it is described that a plural set of corresponding photographed points are detected from plural images including common patterns, which are photographed at one spot by means of an image pick-up apparatus such as a digital camera, then angles formed by these correspondent photographed points and the optical axis of the image pick-up system of the image pick-up apparatus are calculated, then parameters for correcting distortion of the image is estimated based on the information of the calculated angles.

Further, as described in Japanese Patent No. 3461061 (hereinafter referred to as "reference 3"), a correction process which uses the cosine fourth law known as an extinction rate is generally known as a peripheral light intensity correction process. In the reference 3, it is described that an apparatus includes a diaphragm control means for controlling a diaphragm stop in a photographic lens system, a compensating filter located in the photographic lens system, capable of variably controlling density applied to a neighborhood of a center of an image circle, and a filter control means for controlling the compensating filter in conjunction with the a diaphragm control means in order to compensate degradation of peripheral light intensity caused by degradation of aperture efficiency at a neighborhood of opening diaphragm.

However, in these conventional apparatuses and processes there exists a disadvantage where process data need to be transmitted between apparatuses and consequently the process becomes complicated. That is, in the conventional process for transmitting image data from an image recording apparatus to an image processing apparatus, a user manually selects an image file and process software for the image processing apparatus, so that it takes trouble in executing the process.

SUMMARY OF THE INVENTION

The present invention has been made in consideration of above mentioned actualities, thus one object of the invention is to provide an image recording apparatus and an image processing system capable of executing automatically and simply an image data process (e.g. an image process such as distortion aberration correction or peripheral light intensity correction).

It is an aspect of the present invention that an image processing system comprises image data keeping structure for keeping image data and process information added to the image data, and an image processing structure for receiving the image data to which the process information is added, wherein the image processing structure executes an image process on the image data based on the added process information.

It is another aspect of the present invention that an image recording apparatus for executing an image process on read image data and for recording the image-processed image data comprises an image producing device for obtaining the image data, an image processing device for executing an image process based on process information transmitted from the image producing device, together with the image data, and a recording device for recording the image data image-processed by the image processing device.

It is another aspect of the present invention that an image recording apparatus for reading image data, for executing an image process on the image data, and for storing the image-processed image data comprises an image producing device for obtaining the image data, an image processing device for executing an image process based on process information transmitted from the image producing device, together with the image data, and a print control device for controlling outputting and printing the image data image-processed by the image processing device.

Further, it is another aspect of the present invention that an image processing system comprises an image recording apparatus including a recording device capable of adding additional information to an image in an image file and of recording the image to which the additional information is added, an image processing apparatus including an image processing device for reading the additional information and for processing the image, and an image file transfer device for transferring the image file between the image recording apparatus and the image processing apparatus, wherein the image processing apparatus executes an image process on the image included in the image file transferred by the image file transfer device, based on the additional information added thereto.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims.

The present application claims the benefit of priority to Japanese Patent Application Nos. JP2004-178855, filed on Jun. 16, 2004, JP2004-233872, filed on Aug. 10, 2004, JP2005-130584, filed on Apr. 27, 2005, and JP2005-130585, filed on Apr. 27, 2005, all of which are hereby incorporated by reference.

BRIEF DESCRIPTION OF THE DRAWINGS

For a better understanding of the invention, reference is made to the attached drawings, wherein.

DETAILED DESCRIPTION OF THE PREFERRD EMBODIMENTS

A First Embodiment of the Present Invention

According to the first embodiment of the present invention, in an image processing device image data are image-processed based on process information transmitted together with the image data from an image producing device, then the image-processed image data are recorded on a recording medium. By way of this, an image process such as distortion aberration correction, peripheral light intensity correction, etc. can be executed automatically and simply.

The first embodiment of the present invention will be described in detail below by referring to the accompanying drawings.

Figure 1B:
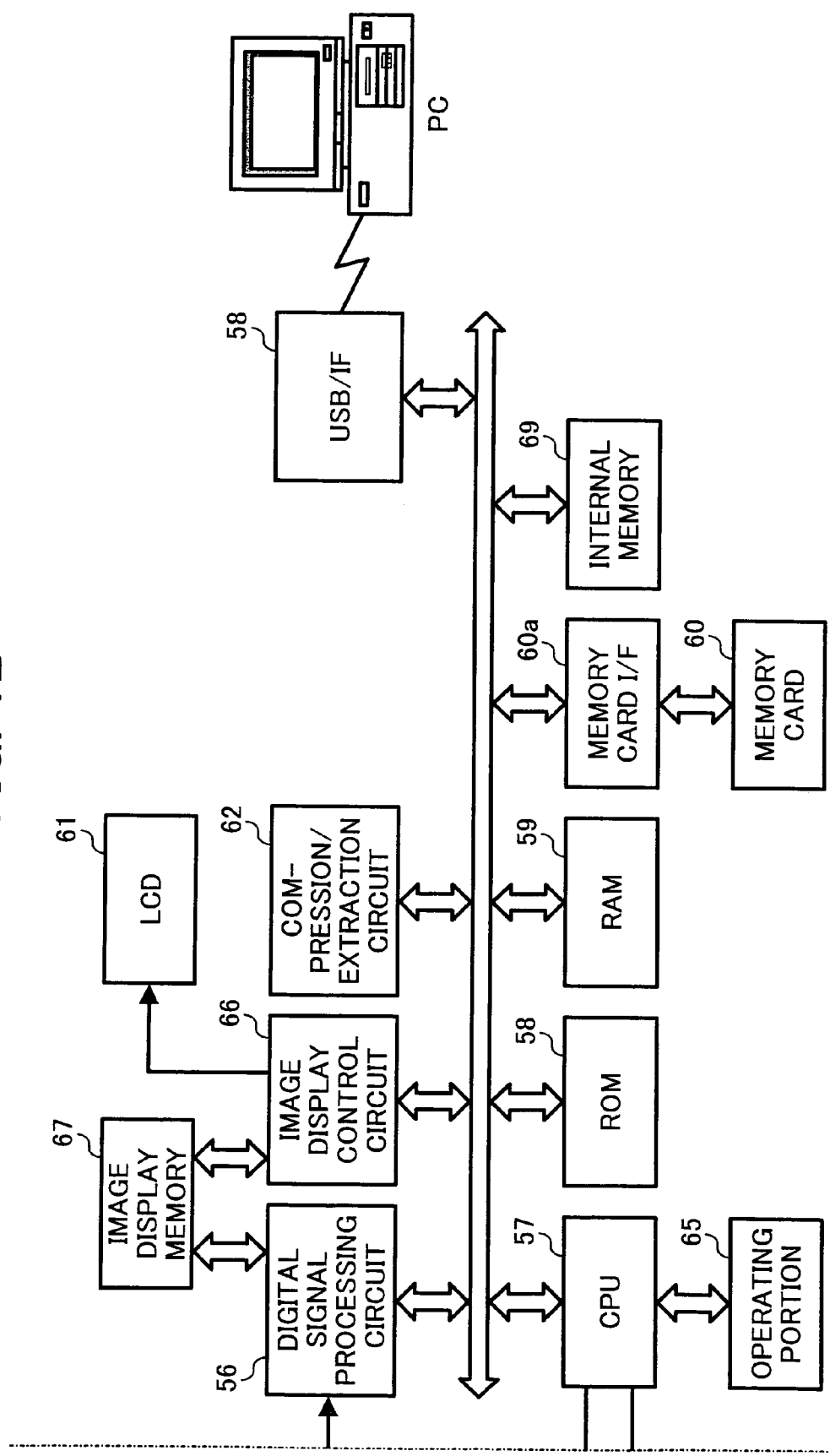
FIG. 1 is a schematic block diagram showing a first embodiment of an image recording apparatus according to the present invention.

FIG. 1 shows a schematic block diagram of a first embodiment of an image recording apparatus according to the present invention.

As shown in FIG. 1, a digital camera 100 as the image recording apparatus is provided with a lens 51, a mechanical structure 52 having an auto focus mechanism, a CCD (Charge Coupled Device) 53, a CDS (Correlated Double Sampling) circuit 54, an A/D converter 55, a digital signal processing circuit 56, a CPU 57, a ROM 58, a RAM 59, a memory card 60, a memory card I/F 60a, an LCD 61, an image compression/extraction circuit 62, a driver 63, an SG (Control Signal Generator) 64, an operating portion 65, an image displaying control circuit 66, an image displaying memory 67, a transmission I/F 68, an internal memory 69, and so forth.

A lens unit includes the lens 51, the mechanical structure 52 including the auto focus (AF) mechanism, a diagram and a filter portion, and so forth. A mechanical shutter of the mechanical structure 52 shields light during reading out charge stored on a CCD-type image photographing device.

The CCD 53 is a circuit for converting an image inputted through the lens unit to electrical signals (analogue image data), and the CDS circuit is a circuit for reducing noise for the CCD-type image photographing device. Further, the A/D converter converts analogue image data imputed from the CCD 53 through the CDS circuit 54, to digital image data. That is, output signals from the CCD 53 pass through the CDS circuit 54 and are converted by the A/D converter to digital signals at optimum sampling frequency (e.g. an integral multiple of sub-carrier frequency of an NTSC signal).

In addition, the digital signal processing circuit 56 sorts out the image data inputted from the A/D converter 55 into color-difference data and brightness data, and executes various processes, correction and a data process for image compressing/extracting. The image compression/extraction circuit 62 performs, for example, orthogonal transformation/inverse orthogonal transformation which is one process of compression/extraction in conformity with the JPEG, Huffman coding/decoding which is another process of compression/extraction in conformity with the JPEG, and so forth.

The ROM 58 stores programs, data necessary for executing programs, etc., and the RAM 59 temporarily stores data to be processed by the CPU 57. Compressed image data are stored in the memory card 60 and the internal memory 69, as image data files.

The image displaying control circuit 66 displays a monitor image or a reproduced image on the LCD 61, and a set state of the digital still camera, for example, a set mode display, an error display and so forth.

The operating portion 65 has buttons for selecting a function, ordering photographing, and configuring other various settings from outside. In one example, a release button generally used at the time of photographing, a zoom key, a mode dial, a strobe button, a macro button, a menu key for displaying guidance on a screen and carrying out a function by operation, up/down/left/right cursor keys, an enter key, a cancel key, a select key, a power button for turning on/off the digital camera, and so forth are employed. Each button may perform other functions according to each operation mode such as a photographing mode, a reproducing mode, a transmission mode, and so forth.

Based on a control program stored in the ROM 58 the CPU 57 controls operation of each part of the digital still camera according to an external instruction, etc. from an operating portion 65 by way of an photographing program in the control program, and processes image data by way of an image processing program in the control program. For example, the CPU 57 executes recording operation control of image data for the memory card 60, reproducing operation control of an image data file recorded in the memory card 60, a connection process on image data, a correction process on image data, and so forth. That is, the CPU 57 functions as an image producing device (photographing device), a reproducing control device, a communication device, an image processing device, and so forth.

The image displaying memory 67 stores plural planes, and image display control is carried out in the form of a composite display by way of superposing each plane. While superposing each plane a display position, a display magnification, brightness, a transparent attribute, etc. are controlled on a plane to plane basis.

A data structure to be processed by the image recording apparatus of FIG. 1 will be explained below.

Figure 2:
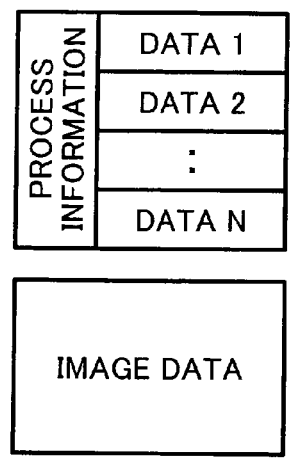
FIG. 2 is a diagram showing an example of a data structure to be processed by the image recording apparatus of FIG. 1.
Figure 3:
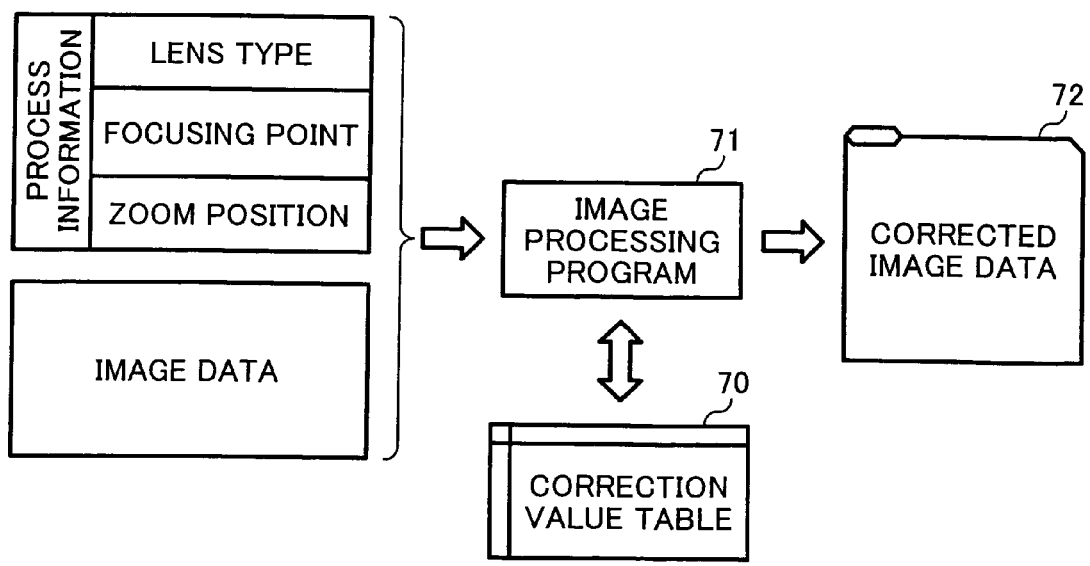
FIG. 3 is an explanatory diagram showing a process for a more specific data structure to be processed by the image recording apparatus of FIG. 1.

FIG. 2 is a diagram showing an example of a data structure processed by the image recording apparatus of FIG. 1, and FIG. 3 is an explanatory diagram showing a process executed on a more specific data structure.

As shown in FIG. 2, various data (data 1-data N) are added to image data as process information. As these process information, for example, information relative to lens characteristic (i.e. information relative to distortion aberration in terms of distortion aberration correction), information of peripheral light intensity as information relative to peripheral light intensity correction, and so forth are stored.

In addition, as shown in FIG. 3, if information of a lens type, a focusing point and a zoom position are added to the data 1, data 2 and data 3 respectively, and if tables 70 including distortion aberration correction values and peripheral light intensity correction values in accordance with focusing points and zoom positions are prepared in advance on a lens to lens basis, then the CPU determines a table according to a lens type and determines correction values according to a focusing point and a zoom position, and image data 72 is obtained in compliance with the correction values. That is, an image process can be selected by way of selecting various data (data 1-data N) according to need.

By way of this, data results from produced image data on which a distortion aberration correction process is executed according to distortion aberration information, data results from produced image data on which a peripheral light intensity correction process is executed according to peripheral light intensity information, and so forth can be recorded.

Further, data results from produced image data on which a distortion aberration correction process is executed according to a lens type, a focusing point and a zoom position, data results from produced image data on which a peripheral light intensity correction process is executed according to a lens type, a focusing point and a zoom position, and so forth can be recorded.

Specifically, it is known that the distortion rate D (%) is represented by the following formula.

$$D=(Y-H)/H \times 100$$

"Y" designates an actual height of a (photographed) image.
"H" designates an ideal height of an image.

In the case where the formula above is known in advance, an ideal image height H can be determined for an actual (photographed) image height Y to be corrected, and thus distortion rate can be corrected by way of correcting a height of image.

The cosine fourth low means a phenomenon where when a object to be photographed on an optic axis shifts toward right angle to the optic axis, although brightness of the object stays the same brightness, brightness of an imaging surface decreases proportional to the fourth power of the cosine of the angle between the optical axis and the principal ray from the object.

Figure 8:
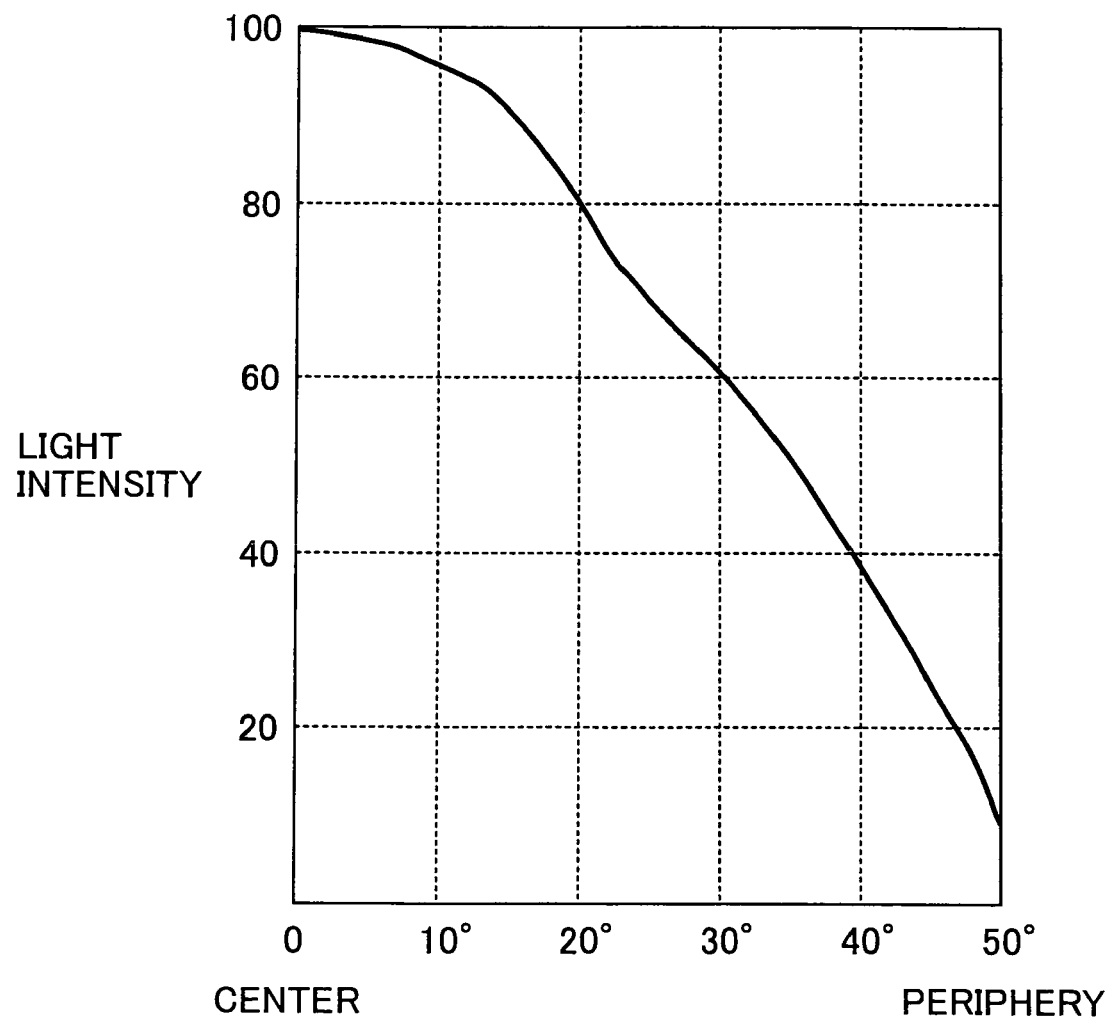
FIG. 8 is a graph showing degradation of light intensity of a peripheral portion grounded on the cosine fourth law.

FIG. 8 is a graph showing degradation of light intensity of a peripheral portion based on the cosine fourth law.

By way of correcting brightness of a peripheral portion of an image according to the cosine fourth law so that it may be substantially the same brightness of the center portion, the light intensity of the peripheral portion of the image can be corrected.

The relation between a photographing operation and an image processing operation will be described below by referring to the FIG. 4.

According to the first embodiment of the present invention, if the release button is pushed and the photographing program is initiated, then image data are produced and the image data are transferred together with process information to the image processing program, and after completion of a predetermined correction process in conformity with the process information the image data on which the correction process is executed is transferred to the photographing program and is recorded on the memory card 60.

Further to this, in the image recording apparatus of this embodiment, the CPU 57 constitutes an image producing device by controlling each part of the apparatus according to the photographing program, and the CPU 57 also constitutes an image processing device by controlling each part of the apparatus according to the image processing program constitute.

Figure 4:
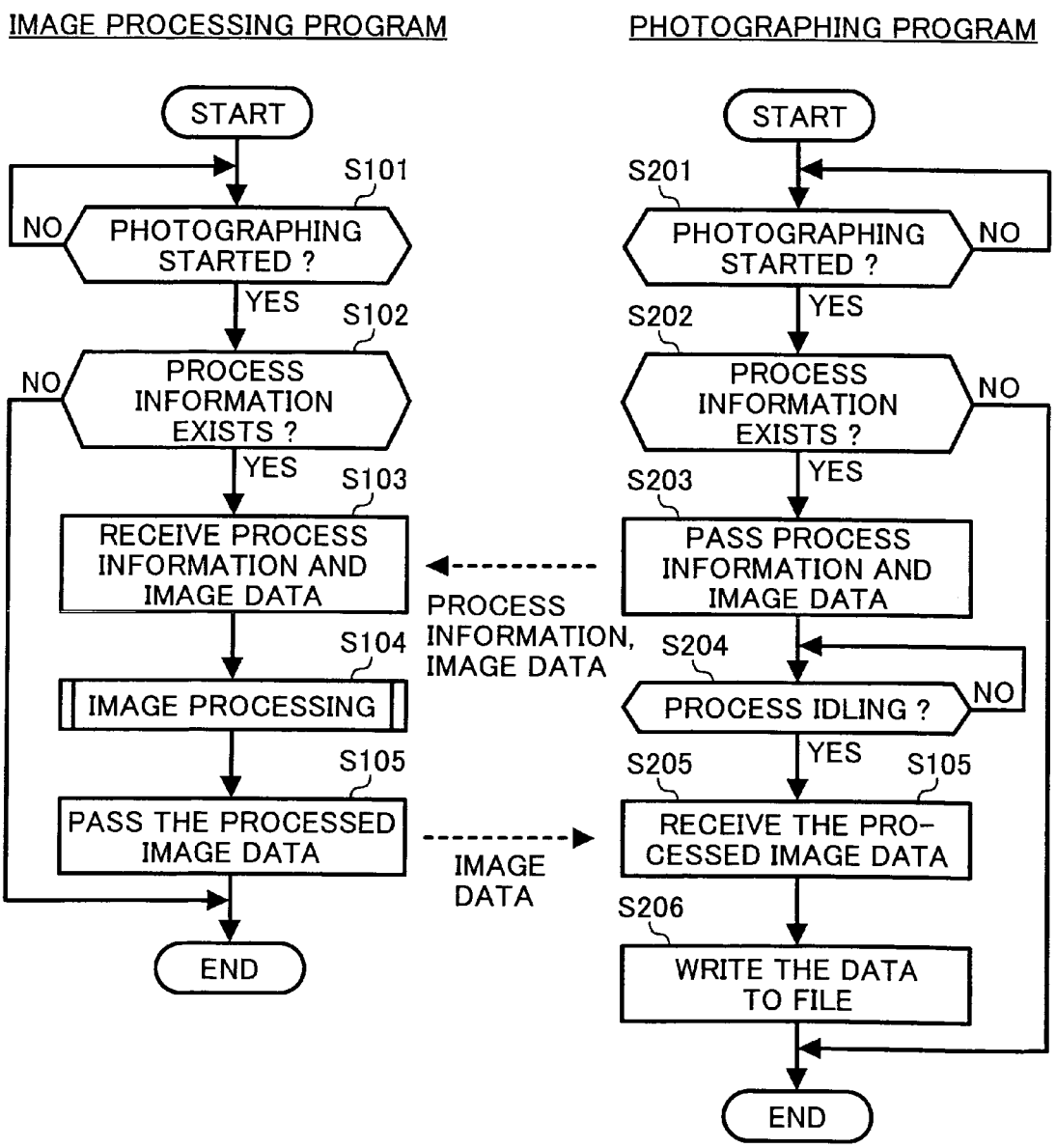
FIG. 4 is a flow chart showing relation between a photographing operation and an image processing operation of the image recording apparatus of FIG. 1.

FIG. 4 is a flow chart showing relation between a photographing operation and an image processing operation of the image recording apparatus of FIG. 1. In this embodiment, the CPU 57 executes the image processing program and the photographing program.

If the operation of both the image processing program and the photographing program is started, then whether photographing is started or not is judged (Step 101 and Step 201), and then whether process information for processing an image exists or not is judged (Step 102 and Step 202). In the photographing program if it is determined that a process to be executed exists ('YES' in the Step 202), then the process information and the image data are transferred to the image processing program side (Step 203).

In the image processing program, the process information and the image data transferred to the image processing program side are received (Step 103), an image process is executed on the image data in accordance with the process information (Step 104), and the processed image data are transferred to the photographing program side (Step 105).

In the photographing program, after transferring the process information and the image data to the image processing program side in the Step 203 whether a process is idling or not is judged (Step 204), in the case it is determined that process to be executed exists ('YES' in the Step 204), then the processed data transferred to the photographing program side is received (Step 205), and the processed data are recorded on a file, i.e. the memory card 60 (Step 206).

By so doing, an image process such as distortion aberration correction or peripheral light intensity correction can be executed automatically and simply according to the process information added to the image data.

[Alternative]

An alternative to the first embodiment of the image recording apparatus in accordance with the present invention will be described below.

Figure 5:
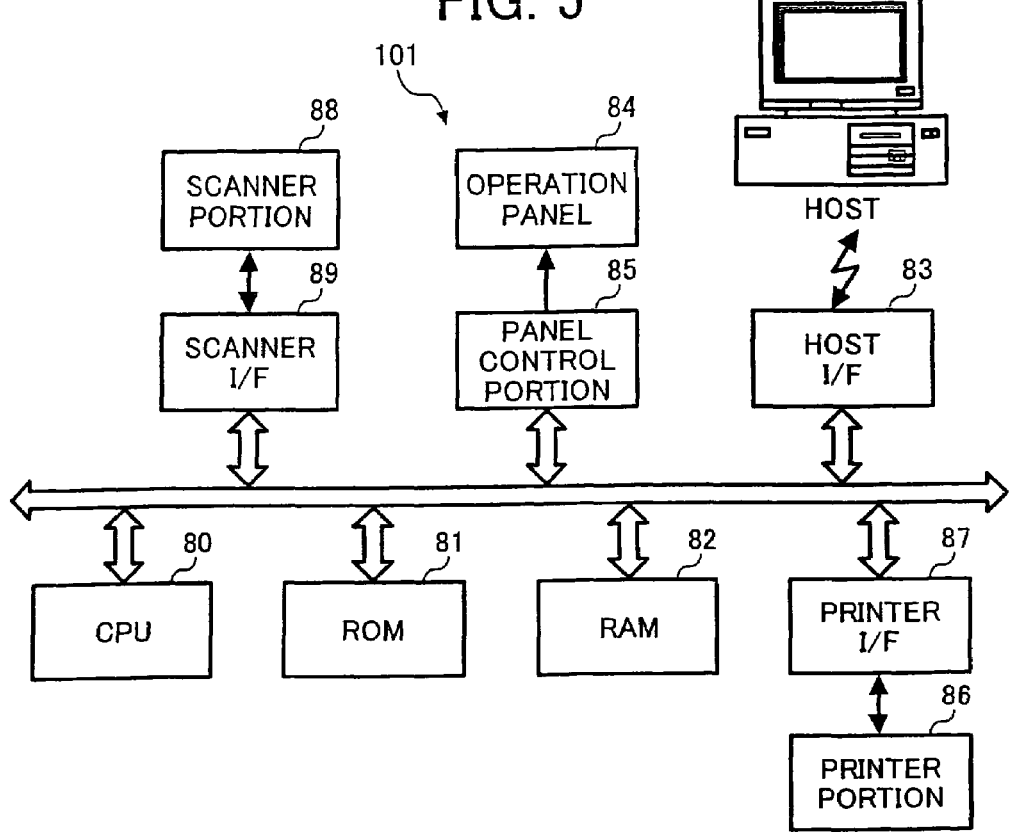
FIG. 5 is a schematic block diagram showing an alternative to the first embodiment of an image recording apparatus according to the present invention.

FIG. 5 is a schematic block diagram showing the alternative to the first embodiment of an image recording apparatus according to the present invention.

As shown in FIG. 5, an MFP (Multifunction Printer) 101 as the image recording apparatus is provided with a CPU 80 for executing processes by way of programs, a ROM 81 for storing programs and font data, a RAM 82 for temporarily storing print data and video data converted to a print pattern, a host I/F 83 for connecting a host machine such as a PC, a panel control portion 85 and a operation panel 84 for performing an interface function of converting control operations, a printer I/F 87 and a printer portion 86 for performing a printing operation, a scanner I/F 89 and a scanner portion 88 for performing a scanning operation, and so forth. Further, a facsimile controller, a memory card interface, a USB port for directly connecting a digital camera, and so forth can be employed.

A data structure to be processed by the image recording apparatus of FIG. 5 will be explained below.

Figure 6:
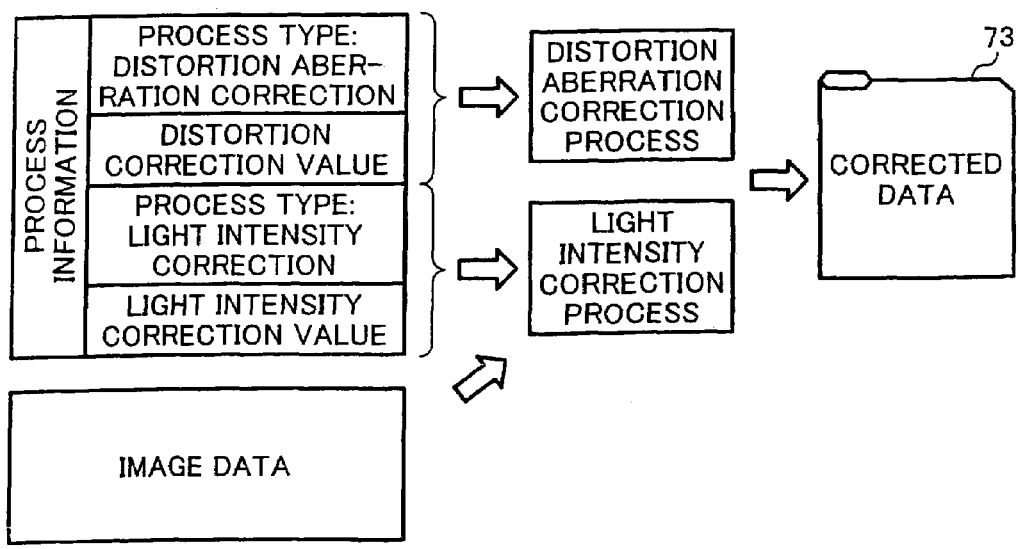
FIG. 6 is an explanatory diagram showing a process for a data structure to be processed by the image recording apparatus of FIG. 5.

FIG. 6 is an explanatory diagram showing a process on a data structure processed by the image recording apparatus of FIG. 5.

As shown in FIG. 6, process information is added to image data. In this case, for example, the process information is relative to a process type of distortion aberration correction, a correction value concerning distortion aberration, a process type of peripheral light intensity correction, and a correction value concerning peripheral light intensity. Thus, the CPU 80 executes a distortion aberration correction process and a peripheral light intensity correction process according to the image correction processing program 71, then corrected image data 73 is obtained by way of the correction process. That is, an image process can be selected by way of selecting various data according to need. By way of this, the data on which a correction process is executed based on a correction value and a process type of correction for the produced image can be recorded.

Further to this, the process information described in the first embodiment may be applied to this alternative. Also, the process information described in this alternative may be applied to the first embodiment.

The relation between a printing operation and an image processing operation will be described below by referring to the FIG. 7.

According to the alternative of the first embodiment of the present invention, if the print start button is pushed and the print control program is initiated, then image data are produced and the image data are transferred together with process information to the image processing program, and after completion of a predetermined correction process in conformity with the process information the image data on which the correction process is executed is transferred to the print control program, then a printing operation is performed.

Further to this, the CPU 80 constitutes a print control device by controlling each part of the apparatus according to the print control program, and also, the CPU 80 constitutes an image processing device by controlling each part of the apparatus according to the image processing program.

Figure 7:
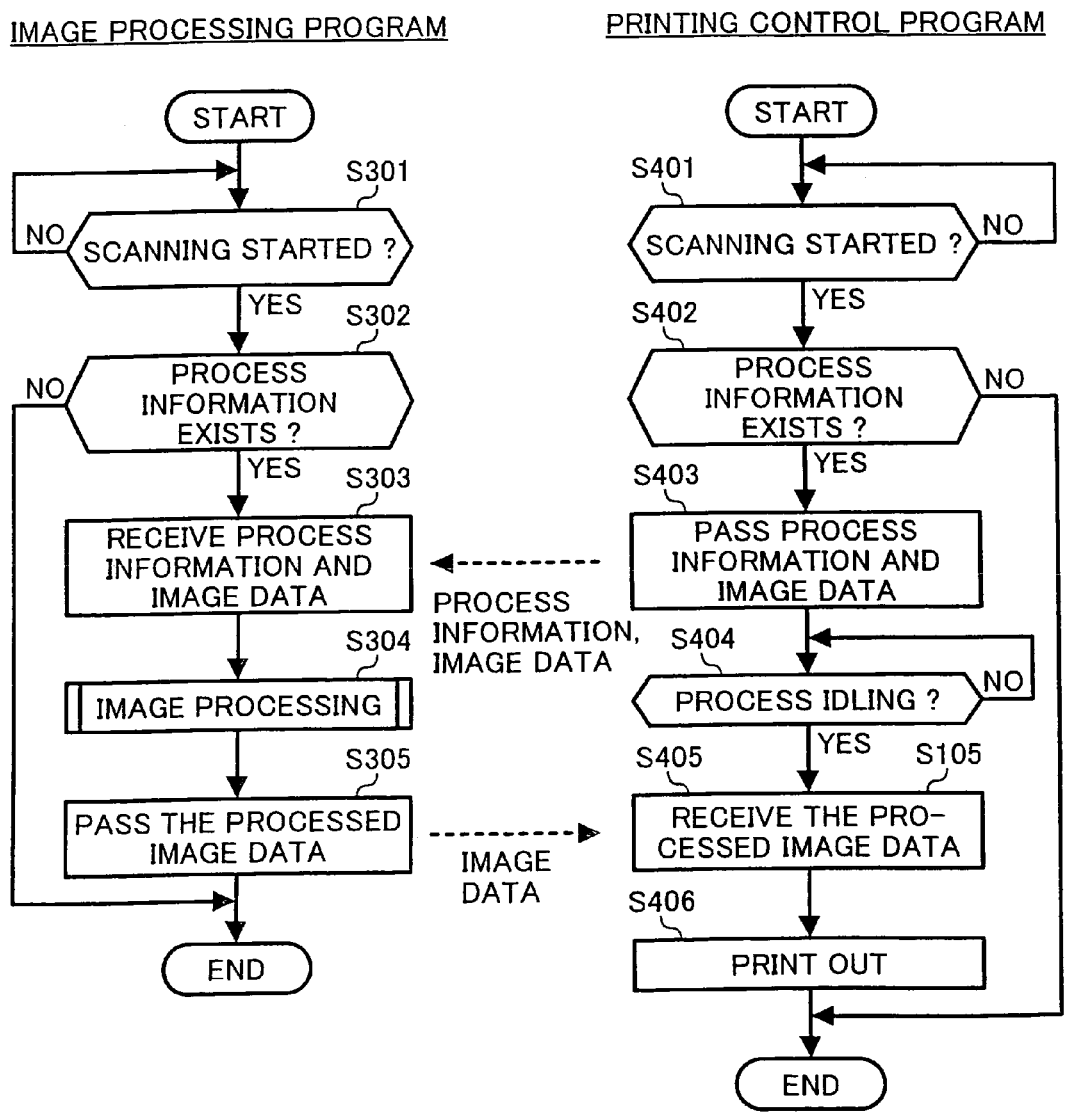
FIG. 7 is a flow chart showing relation between a print control operation and an image processing operation of the image recording apparatus of FIG. 5.

FIG. 7 is a flow chart showing relation between a print control operation and an image processing operation of the image recording apparatus of FIG. 5. The image processing program and the print control program are configured to be executed by the CPU 80.

If the operation of both the image processing program and the print control program are started, then whether scanning operation is started or not is judged (Step 301 and Step 401), and then whether process information for processing an image exists or not is judged (Step 302 and Step 402). In the print control program if it is determined that a process to be executed exists ('YES' in the Step 402), then the process information and the image data are transferred to the image processing program side (Step 403).

In the image processing program, the process information and the image data transferred to the image processing program side are received (Step 303), then an image process is executed on the image data in accordance with the process information (Step 304), and the processed image data are transferred to the print control program side (Step 305).

In the print control program, after transferring the process information and the image data to the image processing program side in the Step 403 whether a process is idling or not is judged (Step 404), in the case it is determined that process to be executed exists ('YES' in the Step 404), then the processed data transferred to the print control program side is received (Step 405), and the processed data are transferred to the printer portion 86, and is outputted and printed out (Step 406).

By so doing, as described above, an image process such as distortion aberration correction or peripheral light intensity correction can be automatically and simply executed by way of the process information added to the image data.

Although as an image recording apparatus a digital camera 100 and an MFP 101 are cited and are explained as an example in the embodiments above, each of them is only an example, and the present invention can be applied to an image forming apparatus such as a copying apparatus, a printer, a facsimile, and so forth.

A Second Embodiment of the Present Invention

In the second embodiment of the present invention, when an image processing apparatus loads an image from an image recording device, the image processing apparatus is configured to execute an image process based on additional information added to the image in an image file. By way of this, when an image is loaded a process to be executed can be automatically selected and a file can be processed, thus a process on image data can be simply executed.

An image processing system as the second embodiment of the present invention will be described in detail below by referring to drawings. The image processing system explained here is capable of transferring image data and additional data to and from a digital still camera etc. having a function which makes the additional data such as a memorandum or information for executing an instructed process be embedded within (be added to) the image, and also capable of transferring to and from, in this example, a personal computer as an image processing apparatus. By photographing after a photographer selects desired entry contents with an LCD (Liquid Crystal Display) of the digital still camera (image recording apparatus), the entry contents are embedded in (are added to) an image data file as additional data and are recorded. Alternatively, entry contents may be selected and embedded during reproducing an image. Concerning entering a memorandum, sound and/or image data may be embedded in an additional data area in the interest of saving trouble.

Figure 9:
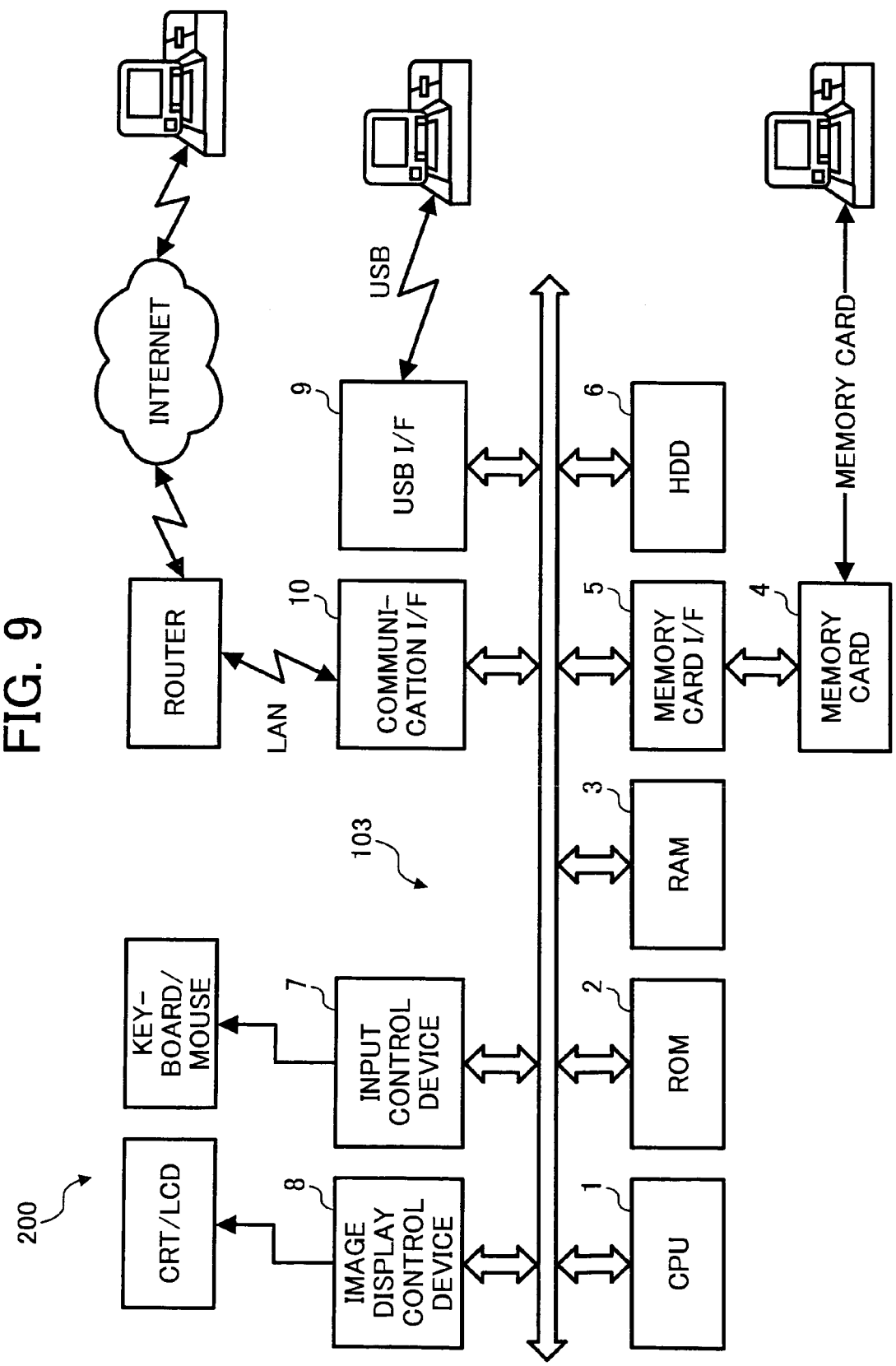
FIG. 9 is a block diagram showing a key part of an image processing apparatus employed in an image processing system as a second embodiment of the present invention.

FIG. 9 is a block diagram showing a key part of an image processing apparatus 103 employed in an image processing system 200 as a preferred embodiment for carrying out the present invention. As shown in FIG. 9, the image processing apparatus 103 is provided with a CPU 1 which execute a process according to a program, a ROM 3 and a RAM 3 which store programs, a memory card 4 which stores data, a memory card I/F 5, an HDD 6, a input control device 7 including a keyboard and/or a mouse, an image display device 8 which controls an image displayed on an LCD or a CRT, a USB I/F 9 which performs transmission with an external apparatus, a communication I/F 10. In this connection, for acquiring data at least one way such as transfer by means of the memory card 4 or communication by means of a USB, a LAN and so forth may be employed.

They can be constituted of a personal computer (PC) 110 and image acquiring software (SW). An operating system (OS) is installed in the PC 110, and the SW is executed by a function of the OS. A recording apparatus such as an HDD, etc. is installed in the PC 110, and the recording apparatus is managed as recording areas by a file system (FS) as a function of the OS. Application software can access the recording areas by a function provided by the OS, and a recording area is assigned with a file-pass name consists of a drive name, a folder name and a file name. With such a constitution, an image file transfer device which transfers an image file to and from a digital still camera is performed in the PC 110.

Figure 10:
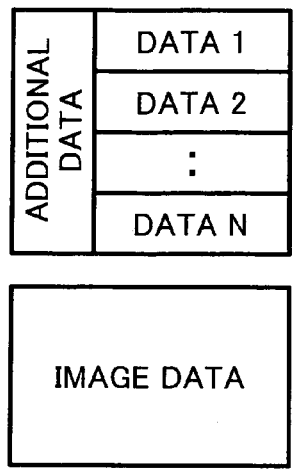
FIG. 10 is a schematic diagram showing a basic structure of a file.

FIG. 10 is a schematic diagram showing a basic structure of a file. Information relating to a lens characteristic is stored as additional data, and based on this information a distortion aberration correction process and/or a peripheral light intensity correction process are performed in accordance with the operation flow described later. The structure of a file may be a structure where additional data are stored in an option area of a standardized format such as EXIF (Exchangeable Image File Format), etc. With operation based on the additional information concerning a lens characteristic a distortion aberration correction process and/or a peripheral light intensity correction process can be performed at the time of acquiring an image. Thus, since a file is automatically selected and processed at the time of acquiring an image, the process on the image data can be simply executed. In this connection, a table look-up method where a lens distortion aberration rate at each focusing point and zoom position is determined in advance and so forth are known as a distortion aberration correction process (See the reference 2).

As mentioned above, in the case where the distortion rate D (%) is known in advance, an ideal image height H can be determined for an actual (photographed) image height Y to be corrected, and thus distortion rate can be corrected by way of correcting a height of image.

If table data are made in advance for each focusing point and zoom position with the formula above, distortion aberration correction can be performed.

As a peripheral light intensity correction process, a correction process using the above mentioned cosine fourth law which is known as an extinction rate and so forth are generally known (See the reference 3).

By way of correcting brightness of a peripheral portion of an image according to the cosine fourth law so that it may be substantially the same brightness of the center portion, the light intensity of the peripheral portion of the image can be corrected.

Figure 11:
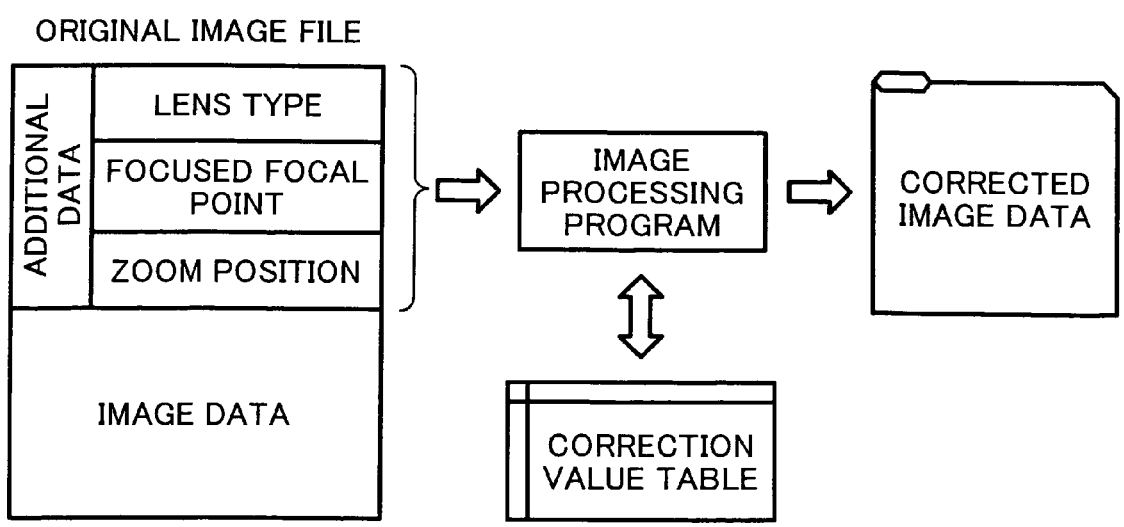
FIG. 11 is a schematic diagram showing a first example of additional data.

FIG. 11 is a schematic diagram showing a first example of additional data. In the FIG. 11 is shown a case where a lens characteristic, a focusing point and a zoom position at the time of recording are treated as additional information. A lens characteristic, a focusing point at the time of photographing, and a zoom position are respectively configured as data 1, data 2, and data 3, for a distortion aberration correction process. The image processing apparatus has correction value tables for each lens, as to distortion aberration and peripheral light intensity on the basis of focusing points and zoom positions, and thus the image correction processing program can read out the additional data in the image file, determine a correction value table in conformity with the lens type, and determine a correction value in conformity with the focusing point and the zoom position.

Figure 12:
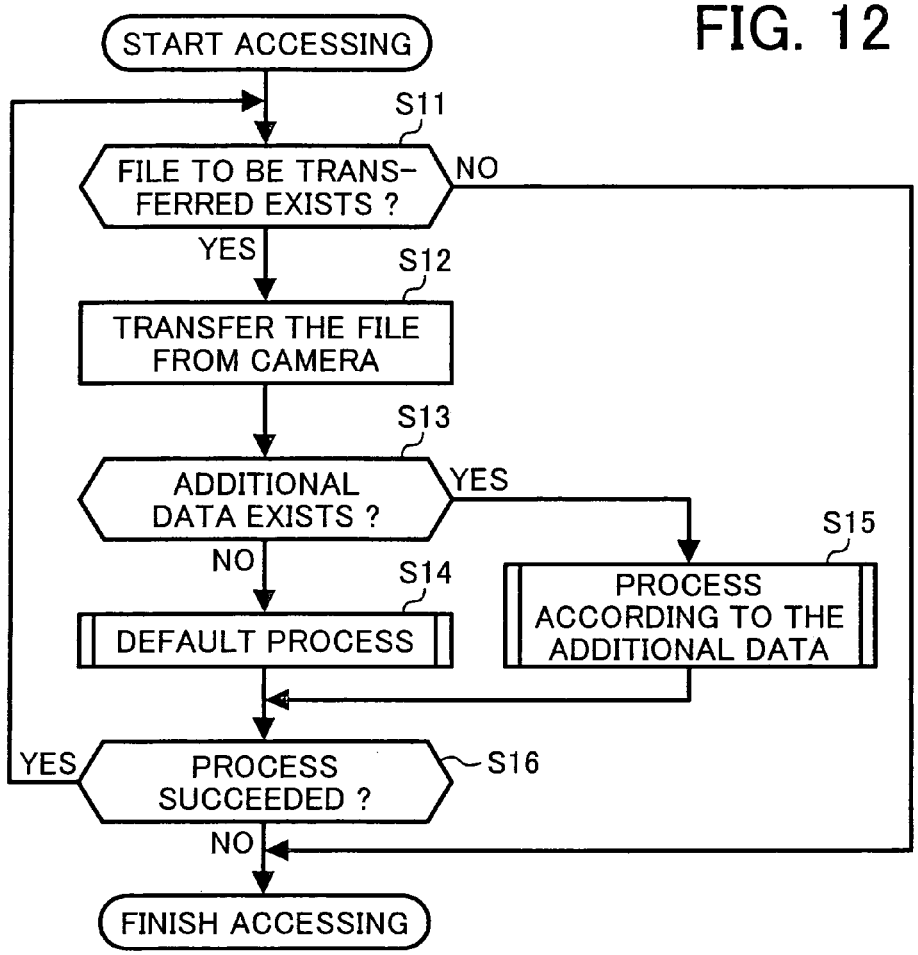
FIG. 12 is a flow chart showing a processing operation of the image processing system as the second embodiment of the present invention.

FIG. 12 is a process flow showing the operation where a process is executed based on additional data in the image processing system 200 as a preferred embodiment for carrying out the present invention. In this operation flow, an image data file to which process control data are added by way of a memory card 4 or a USB I/F 9 is received, then in step S11 whether a file to be transferred exists or not is confirmed, and reading out is finished in the case no file exists. In the case a file exists, then the flow proceeds to step S12, the file is transferred from the camera, and whether additional data exist or not is confirmed in step S13, in the case no additional data exists, then a predetermined default process is executed in step S14, and in the case additional data exist, then a process according to the additional data are executed in the step S15. After the step S14 or the step S15 the flow proceeds to step S16 and whether the process succeeds or not is confirmed, in the case the process succeeds, then the flow returns to the step S11, and in the case the process fails, the loading of the data are completed. By way of this, in the case the additional data includes lens characteristic information such as a lens type, a focusing point and a zoom position, an image process for distortion aberration correction and/or peripheral light intensity correction can be executed. Thus, since at the time of loading an image a process to be executed is automatically selected and then a file is processed, a process on image data can be simply executed.

Figure 13:
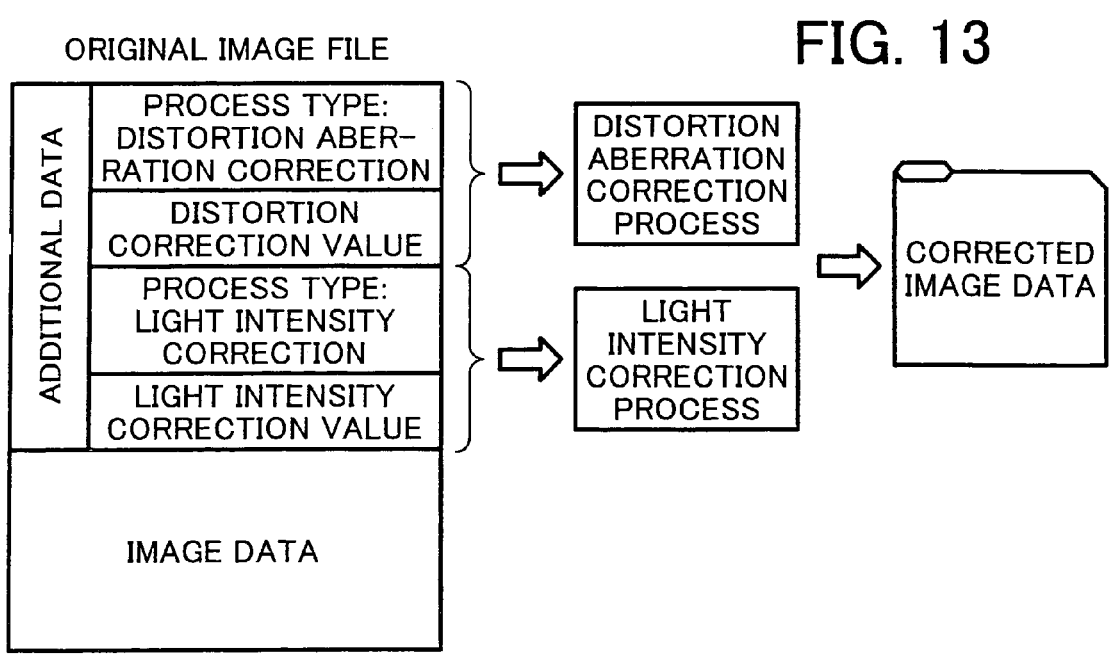
FIG. 13 is a schematic diagram showing a second example of additional data.

FIG. 13 is a schematic diagram showing a second example of additional data. This is the case where a correction value and a process type of correction for an image are treated as additional information. A process type of distortion aberration correction, a correction value concerning distortion aberration, a process type of peripheral light intensity correction, and a correction value concerning peripheral light intensity are respectively configured as data 1, data 2, data 3, and data 4. The correction values are stored in the image recording apparatus, and additional information can be embedded by a recording person at the time of recording. By so doing, the recording person can provide instruction whether a process to be executed exists or not. By executing a process based on the FIG. 13, a correction process can be executed in accordance with correction type information and correction value information at the time of loading an image. Thus, since a process to be executed can be automatically selected and a file can be processed at the time of loading an image, the process on image data can be simply executed.

An alternative to the second embodiment of the present invention, wherein a printer is employed as an image processing apparatus, will be described below. This printer employed in this image processing system is provided with a memory card I/F, so that printing out can be performed without a PC, by being inserted a memory card therein, which is recorded by a digital still camera. In this connection, the printer may be provided with a USB I/F, so that printing can be performed without a PC by connecting a digital camera thereto with a USB cable.

Figure 14:
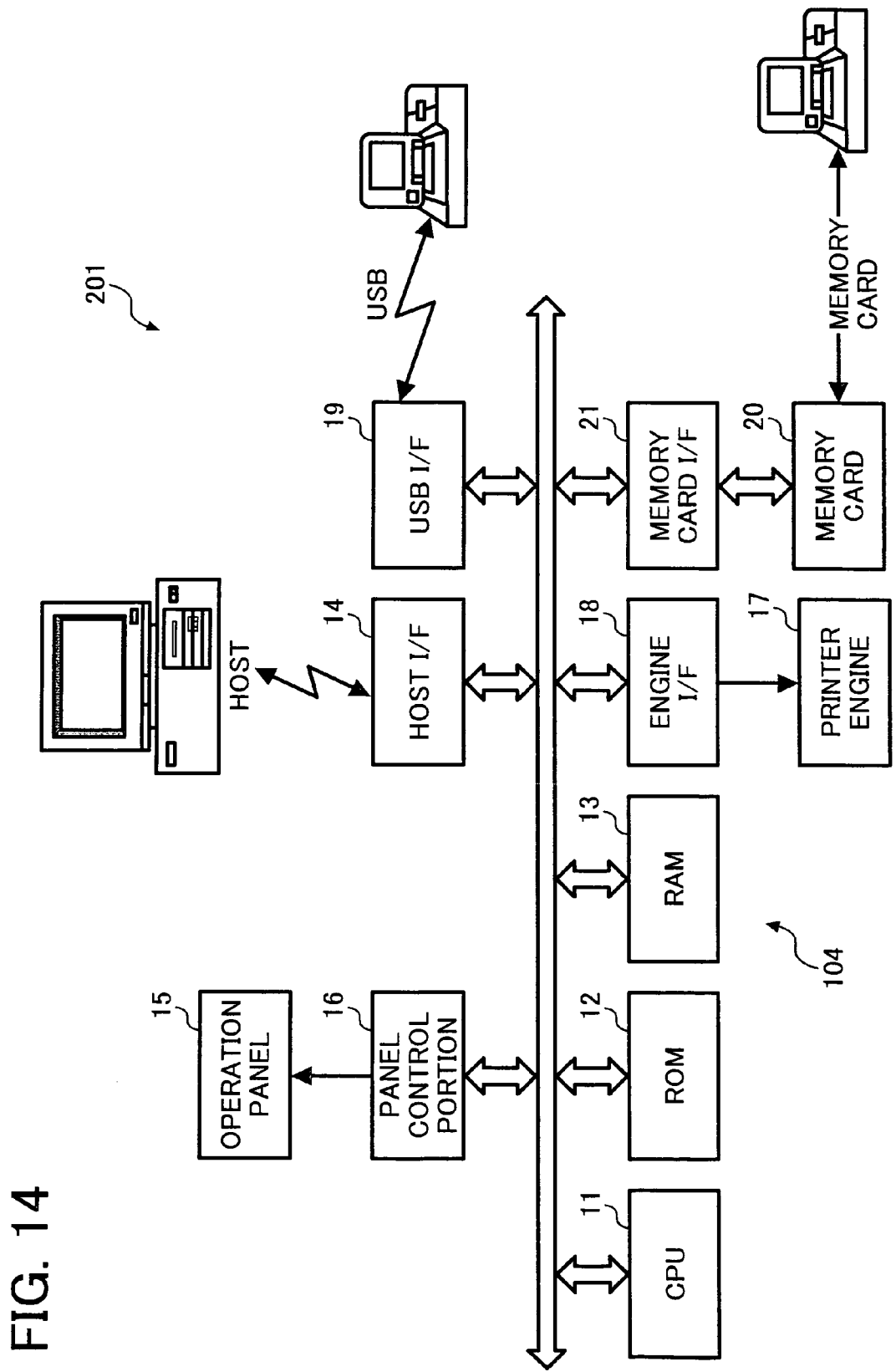
FIG. 14 shows a block diagram of a printer which employed in the image processing system as the second embodiment of the present invention.

A block diagram of the printer 104 of the image processing system 201 is shown in FIG. 14. The printer 104 is provided with a CPU 11 for executing processes based on programs, a ROM 12 for storing programs and font data, a RAM 12 for temporarily storing print data and video data converted to a print pattern, a host I/F 14 for connecting a host machine such as a PC, a panel control portion 16 for controlling a operation panel 15 which performs an interface function and converts control operations, an engine I/F 18 which works in cooperation with a printer engine for performing a printing operation, a USB I/F 19 for directly connecting a digital camera thereto, a memory card I/F 21 for reading out an image from a memory card 20.

Figure 15:
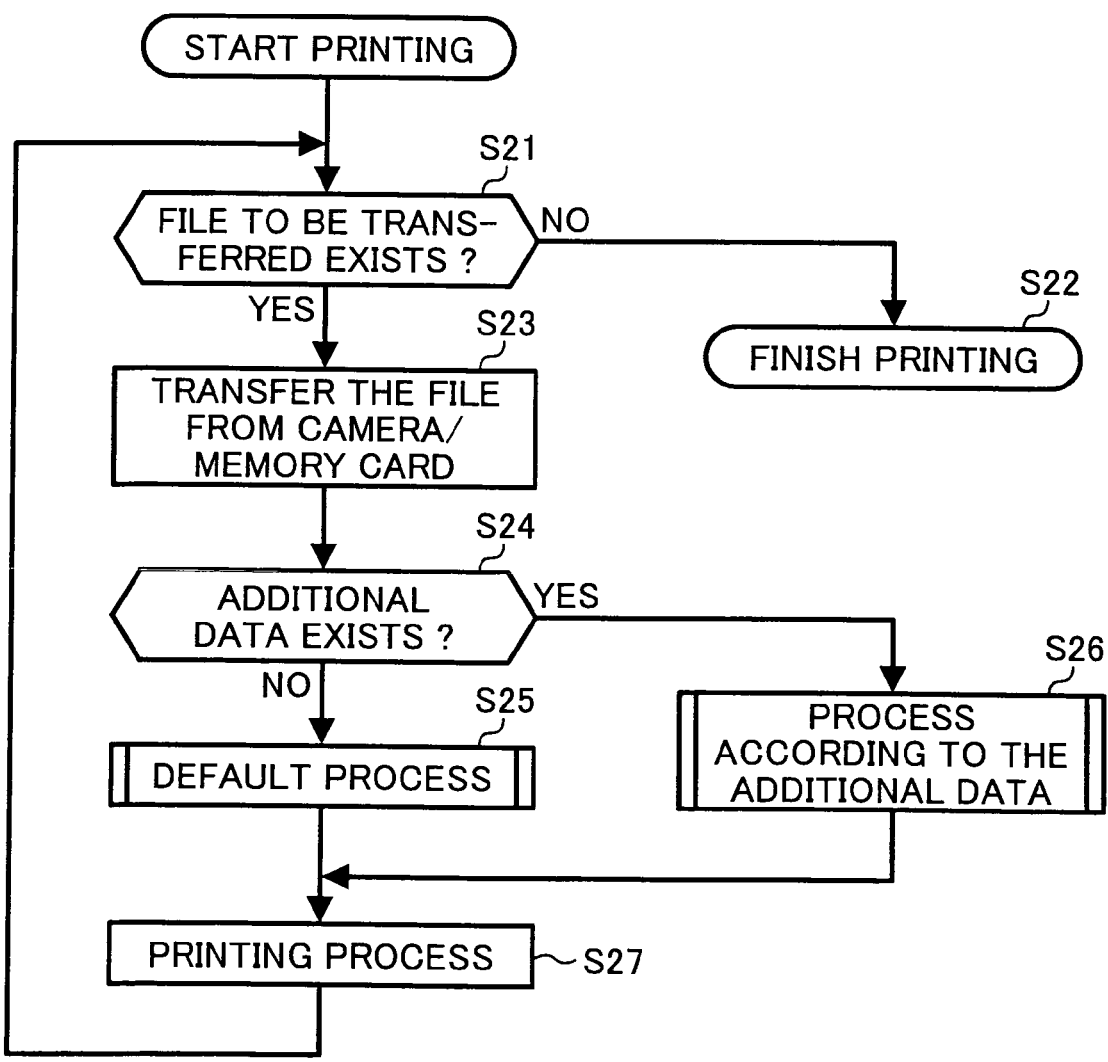
FIG. 15 is a flow chart showing a processing operation of the printer.

FIG. 15 is a flow chart showing an operation of the printer 104. If a memory card 20 is inserted or if a digital camera is connected, then a print program for image files is initiated. Whether a file to be printed exists or not is confirmed in step S21, and in the case no file exists, then the printing operation is finished in step S22. In the case a file exists, then the flow proceeds to step S23, and the file is transferred from the camera/memory card 20, then whether additional data exist or not is confirmed in step S24, and in the case no additional data exists, a predetermined process is executed in step S25. In the case additional data exist, a process is executed based on the additional data in step S26. After the step S25 or the step S26, the flow proceeds to step S27 and a printing process is performed. By way of this, in the case the additional data includes lens characteristic information such as a lens type, a focusing point and a zoom position, a printing operation can be performed after an image process for distortion aberration correction and/or peripheral light intensity correction are executed. Thus, at the time of loading an image, a process to be executed is automatically selected and then a file is processed, thus a process on image data can be simply executed.

What is claimed is:

1. An image processing system, comprising:
   an image data keeping structure for having image data and process information added to the image data; and
   an image processing structure for receiving the image data to which the process information is added,
   wherein the image processing structure executes an image process on the image data based on the added process information and wherein the process information comprises information of a lens type, a focusing point and a zoom position at the time of producing the image, and the image processing device executes a distortion aberration correction process or a peripheral light intensity correction process based on the information of the lens type, the focusing point and the zoom position at the time of producing the image.

2. An image recording apparatus for executing an image process on read image data and for recording the image-processed image data, comprising:
   an image producing device for obtaining the image data;
   an image processing device for executing an image process based on process information transmitted from the image producing device, together with the image data; and
   a recording device for recording the image data image-processed by the image processing device on a recording medium and wherein the process information comprises information of a lens type, a focusing point and a zoom position at the time of producing the image, and the image processing device executes a distortion aberration correction process or a peripheral light intensity correction process based on the information of the lens type, the focusing point and the zoom position at the time of producing the image.

3. The image recording apparatus according to claim 2, further comprising a selection device for selecting the process information to be processed.

4. The image recording apparatus according to claim 2, wherein the process information comprises information of distortion aberration at the time of producing the image and the image processing device executes a distortion aberration correction process based on the information of distortion aberration.

5. The image recording apparatus according to claim 2, wherein the process information comprises information of peripheral light intensity at the time of producing the image and the image processing device executes a peripheral light intensity correction process based on the information of the peripheral light intensity.

6. The image recording apparatus according to claim 2, wherein the process information comprises information of a correction value and a type of a correction process for the produced image, and the image processing device executes a correction process based on the information of the correction value and the type of the correction process for the produced image.

7. An image recording apparatus for reading image data, for executing an image process on the image data, and for storing the image-processed image data, comprising:
   an image producing device for obtaining the image data;
   an image processing device for executing an image process based on process information transmitted from the image producing device, together with the image data; and
   a print control device for controlling outputting and printing the image data image-processed by the image processing device and wherein the process information comprises information of a lens type, a focusing point and a zoom position at the time of producing the image, and the image processing device executes a distortion aberration correction process or a peripheral light intensity correction process based on the information of the lens type, the focusing point and the zoom position at the time of producing the image.

8. The image recording apparatus according to claim 7, further comprising a selection device for selecting the process information to be processed.

9. The image recording apparatus according to claim 7, wherein the process information comprises information of distortion aberration at the time of producing the image and the image processing device executes a distortion aberration correction process based on the information of distortion aberration.

10. The image recording apparatus according to claim 7, wherein the process information comprises peripheral light intensity information at the time of producing the image and the image processing device executes a peripheral light intensity correction process based on the information of the peripheral light intensity.

11. The image recording apparatus according to claim 7, wherein the process information comprises information of a correction value and a type of a correction process for the produced image, and the image processing device executes a correction process based on the information of the correction value and the type of the correction process for the produced image.

12. An image processing system comprising:
    an image recording apparatus including a recording device capable of adding additional information to an image in an image file and of recording the image to which the additional information is added;
    an image processing apparatus including an image processing device for reading the additional information and for processing the image; and
    an image file transfer device for transferring the image file between the image recording apparatus and the image processing apparatus,
    wherein the image processing apparatus executes an image process on the image included in the image file transferred by the image file transfer device, based on the additional information added thereto, and
    wherein the additional information includes information of a lens type, a focusing point and a zoom position at the time of recording, and the image processing apparatus executes a distortion aberration correction process or a peripheral light intensity correction process.

13. The image processing system according to claim 12, wherein the additional information includes lens characteristic information at the time of recording and the image processing apparatus executes a distortion aberration correction process.

14. The image processing system according to claim 12, wherein the additional information includes lens characteristic information at the time of recording and the image processing apparatus executes a peripheral light intensity correction process.

15. The image processing system according to claim 12, wherein the additional information includes information of a correction value and a type of a correction process for the image, and the image processing apparatus executes a correction process according to the additional information.

* * * * *